US010139840B2

(12) United States Patent
Quinones

(10) Patent No.: US 10,139,840 B2
(45) Date of Patent: Nov. 27, 2018

(54) SYSTEM, DEVICE, AND METHOD FOR FLUID DISPENSING CONTROL

(71) Applicant: Horatio Quinones, San Marcos, CA (US)

(72) Inventor: Horatio Quinones, San Marcos, CA (US)

(*) Notice: Subject to any disclaimer, the term of this patent is extended or adjusted under 35 U.S.C. 154(b) by 162 days.

(21) Appl. No.: 15/254,896

(22) Filed: Sep. 1, 2016

(65) Prior Publication Data

US 2017/0068257 A1 Mar. 9, 2017

Related U.S. Application Data

(60) Provisional application No. 62/213,768, filed on Sep. 3, 2015.

(51) Int. Cl.
| | |
|---|---|
| *G05D 7/06* | (2006.01) |
| *G01F 25/00* | (2006.01) |
| *G01M 5/00* | (2006.01) |

(52) U.S. Cl.
CPC ....... *G05D 7/0635* (2013.01); *G01F 25/0092* (2013.01); *G01M 5/00* (2013.01)

(58) Field of Classification Search
CPC ..... G05D 7/0635; G01M 5/00; G01F 25/0092
See application file for complete search history.

(56) References Cited

U.S. PATENT DOCUMENTS

| | | | |
|---|---|---|---|
| 4,927,062 A | 5/1990 | Walsh | |
| 5,277,491 A | 1/1994 | Burnett et al. | |
| 5,865,224 A * | 2/1999 | Ally | B65B 3/34 |
| | | | 141/130 |
| 6,063,339 A | 5/2000 | Tisone et al. | |
| 7,618,590 B2 | 11/2009 | Gleason et al. | |
| 2004/0104242 A1 | 6/2004 | Scordato et al. | |
| 2004/0222240 A1 | 11/2004 | Milian et al. | |
| 2009/0133430 A1 | 5/2009 | Roetker et al. | |
| 2010/0104747 A1 | 4/2010 | Truskett et al. | |
| 2014/0338777 A1 | 11/2014 | Jagtap et al. | |

* cited by examiner

*Primary Examiner* — Carlos R Ortiz Rodriguez
(74) *Attorney, Agent, or Firm* — IDP Patent Services; Olav M. Underdal

(57) ABSTRACT

A system for fluid dispensing control includes a fluid dispensing control device, a fluid dispenser, and a fluid flow meter, such that an intelligent parameterization of the dispensing system includes process variables, which characterize system behavior. The parameterization is used in convergence schemes for attaining defined fluid dispensing targets. Further, the parameterization is used to attain a consistent volumetric fluid dispensing by utilizing feedback controls. A fluid dispensing device includes a processor, a non-transitory memory, an input/output, a dispensing controller, a flow monitor, a parameterization manager, and a data bus. Also disclosed is a method for fluid dispensing control, including: a parameter sweep, logging system response data, processing response data, calculating system response function, calculating dispensing parameters, assessing intrinsic variation, determining variation band, controlling fluid dispense process response, and normalizing mass/volume fluid flow.

20 Claims, 8 Drawing Sheets

Fluid Dispensing Control Device

SYSTEM, DEVICE, AND METHOD FOR FLUID DISPENSING CONTROL

CROSS-REFERENCE TO RELATED APPLICATIONS

This application claims the benefit of U.S. Provisional Application No. 62/213,768, filed Sep. 3, 2015.

FIELD OF THE INVENTION

The present invention relates generally to the field of flow rate measurement and fluid dispensing, and more particularly to methods and systems for parameterization of a fluid dispensing control and monitoring.

BACKGROUND OF THE INVENTION

When dispensing fluid of a large range of viscosities, an in-situ process control as opposed to a-posteriori sampling control has been and it is a preferred choice for multiple reasons.

With the development of faster response time and lower fluid flow rates capabilities, a pseudo real time feedback is attainable to control fluid dispensing accuracy. Multiple algorithms to accomplish this task include PID schemes, and other methods that are general in nature and have universal use and often times may be adequate.

However, existing systems and methods suffer from the disadvantage that they can be difficult to calibrate and once calibrated are prone to output variations due to a lack of control of inherent noise and instability of the dispensing system.

As such, considering the foregoing, it may be appreciated that there continues to be a need for novel and improved devices and methods for dispensing of fluids with highly accurate manufacturing control.

SUMMARY OF THE INVENTION

The foregoing needs are met, to a great extent, by the present invention, wherein in aspects of this invention, enhancements are provided to the existing model of fluid dispensing control and monitoring.

In an aspect, a system for fluid dispensing control can include: a fluid dispensing control device; a fluid dispenser; and a fluid flow meter; such that the fluid dispensing control device communicates with the fluid dispenser to control dispensing of a fluid; such that the fluid dispensing control device communicates with the fluid flow meter to receive information on fluid flow emitted from the fluid dispenser.

In a related aspect, an intelligent parameterization of the dispensing system includes process variables, which characterize system behavior. The parameterization is used in convergence schemes for attaining defined fluid dispensing targets.

In a further related aspect, the parameterization can be used to attain a consistent volumetric fluid dispensing by utilizing feedback controls.

In a related aspect, the fluid dispensing device can include a processor, a non-transitory memory, an input/output, a dispensing controller, a flow monitor, and a parameterization manager, all connected via a data bus.

In another related aspect, a method for fluid dispensing control can include a parameter sweep, logging system response data, processing response data, parameterization of system response, computation of dispensing recipe, assessing intrinsic variation, determining variation band, controlling fluid dispense process response, and normalizing mass/volume fluid flow.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. In addition, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
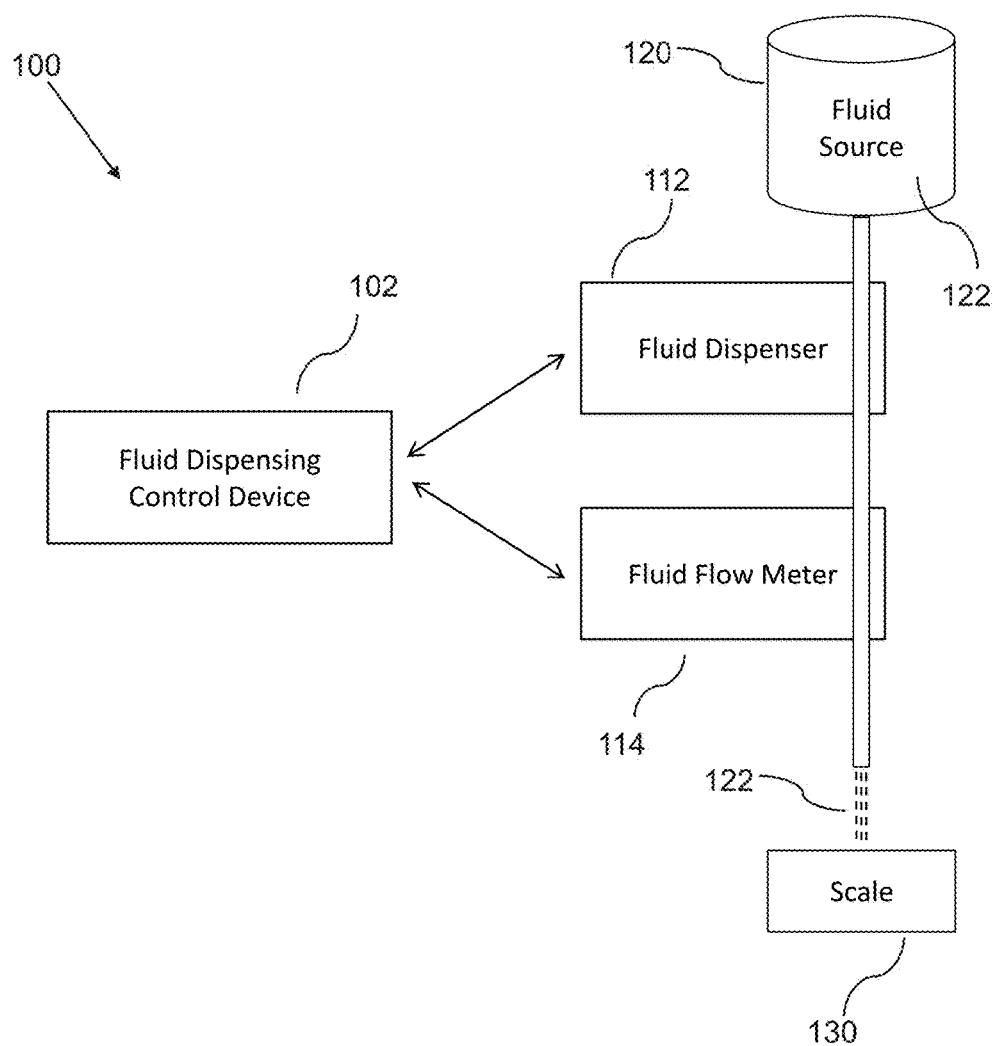
FIG. 1 is a schematic diagram illustrating a system for fluid dispensing control, according to an embodiment of the invention.

Before describing the invention in detail, it should be observed that the present invention resides primarily in a novel and non-obvious combination of elements and process steps. So as not to obscure the disclosure with details that will readily be apparent to those skilled in the art, certain conventional elements and steps have been presented with lesser detail, while the drawings and specification describe in greater detail other elements and steps pertinent to understanding the invention.

The following embodiments are not intended to define limits as to the structure or method of the invention, but only to provide exemplary constructions. The embodiments are permissive rather than mandatory and illustrative rather than exhaustive.

In the following, we describe the structure of an embodiment of a system for system for fluid dispensing control 100 with reference to FIG. 1, in such manner that like reference numerals refer to like components throughout; a convention that we shall employ for the remainder of this specification.

In an embodiment a system for fluid dispensing control 100 can comprise:
  a) a fluid dispensing control device 102;
  b) a fluid dispenser 112; and
  c) a fluid flow meter 114;
    wherein the fluid dispensing control device 102 communicates with the fluid dispenser 112 to control dispensing of a fluid; such that the fluid dispensing control device 102 communicates with the fluid flow meter 114 to receive information on fluid flow emitted from the fluid dispenser 112.

In a related embodiment, a fluid dispensing device 102 can be comprised of:
  a) A processor 202;
  b) A non-transitory memory 204;
  c) An input/output component 206;
  d) A dispensing controller 210;
  e) A flow monitor 212; and
  f) A parameterization manager 214; all connected via
  g) A data bus 220;
    wherein the dispensing controller 210 communicates with the fluid dispenser 112 to control dispensing of a fluid, based on parameterization information obtained in communication with the parameterization manager 214; the flow monitor communicates with the fluid flow meter 114 to receive information on fluid flow emitted from the fluid dispenser 112; and the parameterization manager 214 stores, updates, and processes the parameterization information. The fluid dispenser 112 is in fluid communication with a fluid source 120 to obtain fluid 122 for dispensing.

In related embodiments, the fluid dispensing device 102 can include configurations as:
  a. An electronic device or instrument;
  b. A web application, executing in a Web browser;
  c. A tablet app, executing on a tablet device, such as for example an Android or iOS tablet device;
  d. A mobile app, executing on a mobile device, such as for example an Android phone or iPhone, or any wearable mobile device;
  e. A desktop application, executing on a personal computer, or similar device;
  f. An embedded application, executing on a processing device, such as for example a smart TV, a game console, a programmable instrument, or other system.

In an embodiment, the dispensing controller 210 can be configured to process a mathematical equation to represent a master dispensing recipe, which characterizes the complete dispensing process including, tooling, material and process parameters, and boundary limits as defined by a user.

In another embodiment, a mathematical representation of the master dispensing recipe as defined above and convergence algorithms are used to obtain different fluid dispensing targets and compare process parameters/hardware with parameterized recipe for assessment of possible discrepancies In yet another embodiment, the parameterized recipe, as defined above is used to assess the random/intrinsic variation of the dispensing process and determine process capability.

In another embodiment, the parameterized recipe, as defined above is used to determine parameters as to maintain a target window variation.

Figure 3:
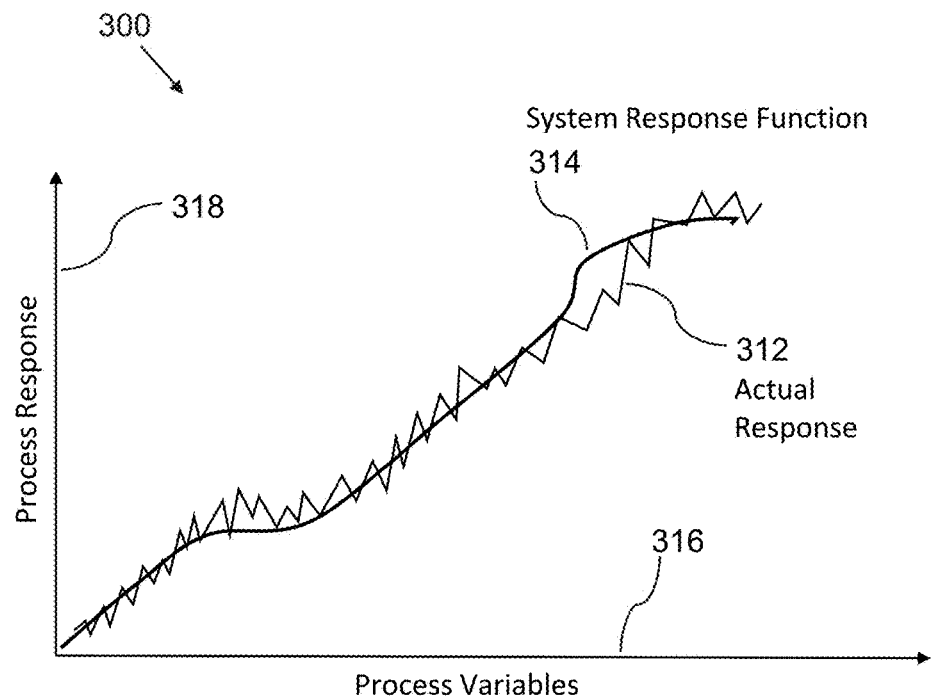
FIG. 3 is a graph illustrating the response of the system for fluid dispensing control, according to an embodiment of the invention.

In a related embodiment, FIG. 3 depicts a graph 300 representing the
  a. process response 318 of the system for fluid dispensing control 100, which can be measured as a fluid flow or volume being dispensed to a given hardware/tooling set; as a function of
  b. process variables 316, which can be exercised within a given operational window;
    wherein an actual response 312 is measured as a sweep of process variables 316 are exercised to collect a set of actual measurements;
    such that mathematical representation/parameterization 314 of system response 312 as function of process variable input 316 is represented as a parameterized system response function 318, which is configured to fit the actual measurement.

Figure 4:
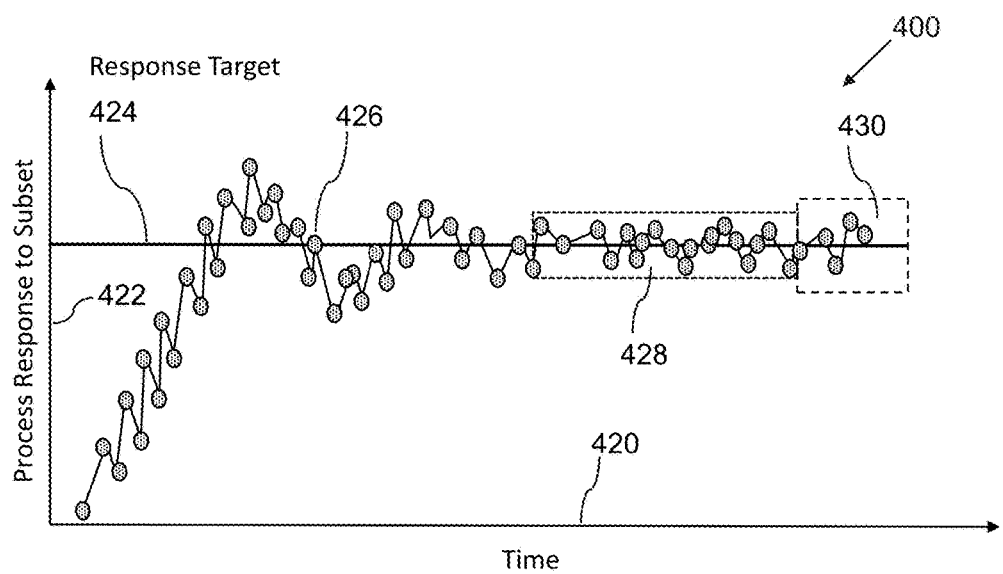
FIG. 4 is a graph illustrating a defined/desired process response target of the system for fluid dispensing control, according to an embodiment of the invention.

In a related embodiment, FIG. 4 depicts a process graph 400, which illustrates convergence to a defined/desired process response target 424. A subset of the process variables 420 are exercised, and a convergence algorithm using the mathematical representation/parameterization function 314 is employed to match/converge measured output 426 to the target 424. Using the mathematical representation/parameterization function 314, the robustness of the process at the target 424 is exercised and the intrinsic variation 428 of the system for fluid dispensing control 100 is determined. A boundary 430 is then defined using the mathematical representation/parameterization function 314, based on and repeated sampling, to determine min/max boundary values.

In the various related embodiment, the system for fluid dispensing control 100 includes parameterizing fluid dispensing system and process parameters to create an intelligent model of the system for fluid dispensing control 100 and/or process, for controlling its response during regular fluid dispensing operation, as for instance during a manufacturing dispensing process.

In a related embodiment, the efficiency of the controlling algorithm, including parameterization of the complete system, allows for faster convergence and intelligent controls.

In a related embodiment, a series of sweeps over the domain of the dispense process variables 316 is performed and the system response 318, such as fluid volume and/or fluid flow rate is recorded. Upon completion of these sweeps, parameterization of the of the system for fluid dispensing control 100 process variables 316 along with their corresponding system response 318, is performed.

In a related embodiment, the system for fluid dispensing control 100 can be configured to assist in the rapid convergence to obtain process parameters to reach a desired dispensing target 424 within an allowed parameter window.

In a related embodiment, the system for fluid dispensing control 100 can be configured to determine dispensing intrinsic variation 428, which includes determining intrinsic noise or variance of system response.

In a related embodiment, the system for fluid dispensing control 100 can be configured to determine sustainable production run for manufacturing. The parameterized system guides the controlling scheme used to best obtain parameters that keep the system from deviations outside a defined window band, and optimizes the control parameters modulation applicable for the system.

Figure 5:
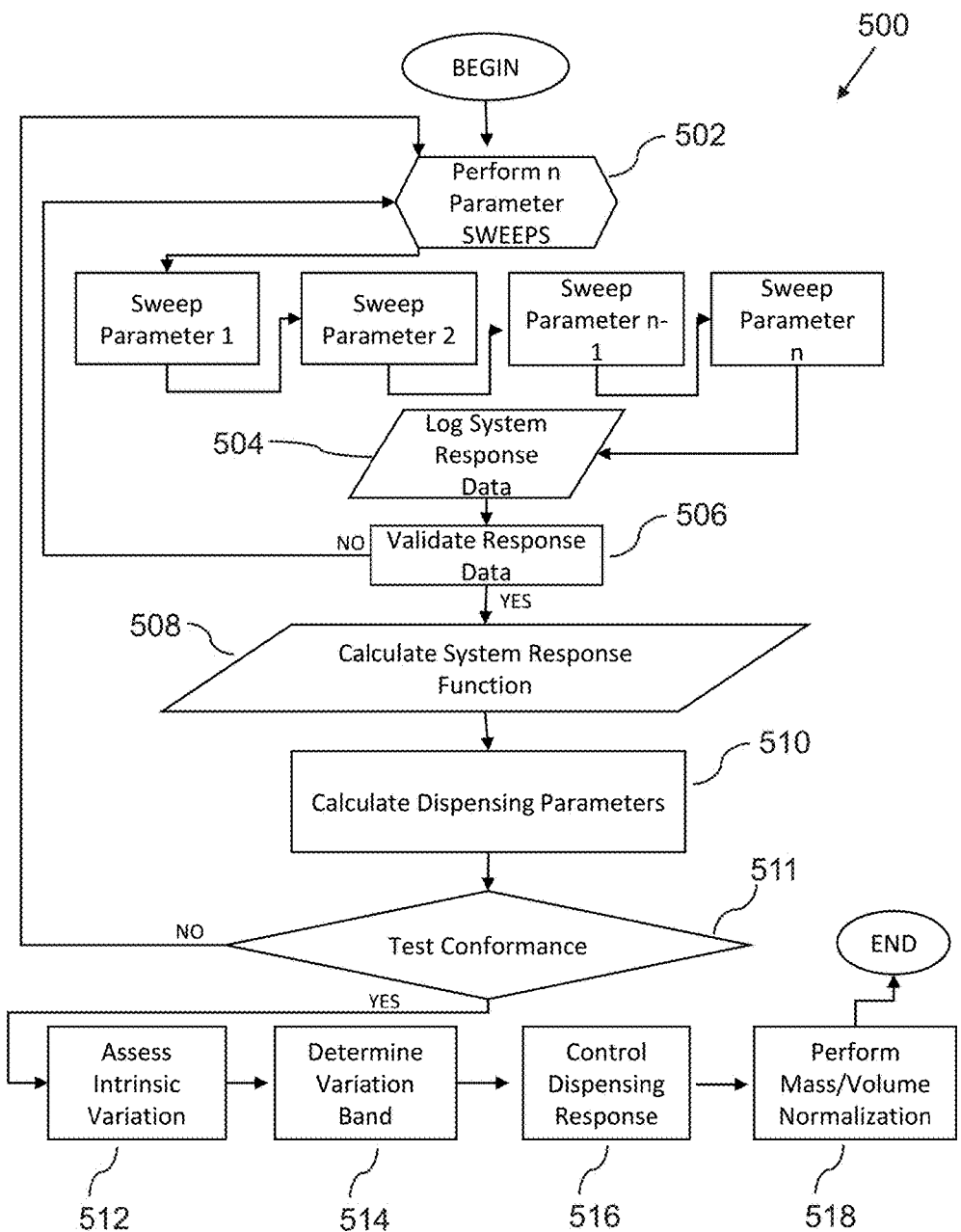
FIG. 5 is a flowchart illustrating steps that may be followed, in accordance with one embodiment of a method or process of fluid dispensing control.
Figure 6:
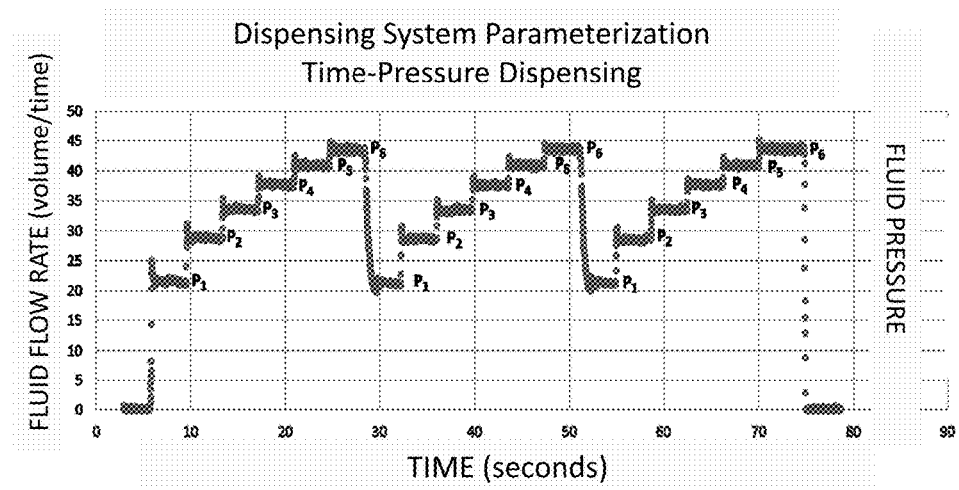
FIG. 6 is a graph illustrating a dispensing parameter pressure sweep of the system for fluid dispensing control, according to an embodiment of the invention.
Figure 7:
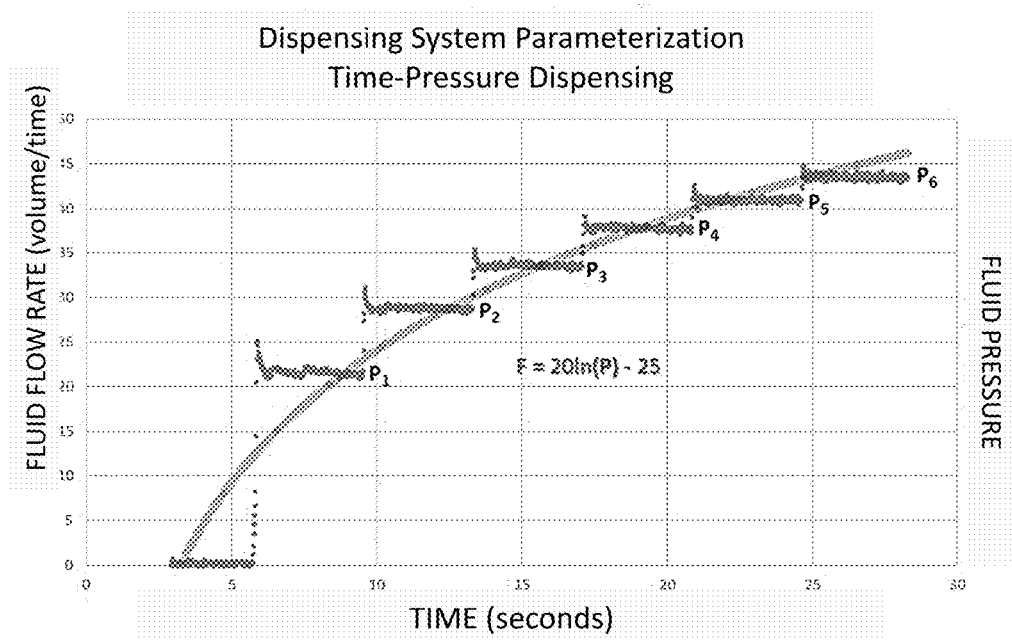
FIG. 7 is a graph illustrating a parameterization curve of the system response of the system for fluid dispensing control, according to an embodiment of the invention.
Figure 8:
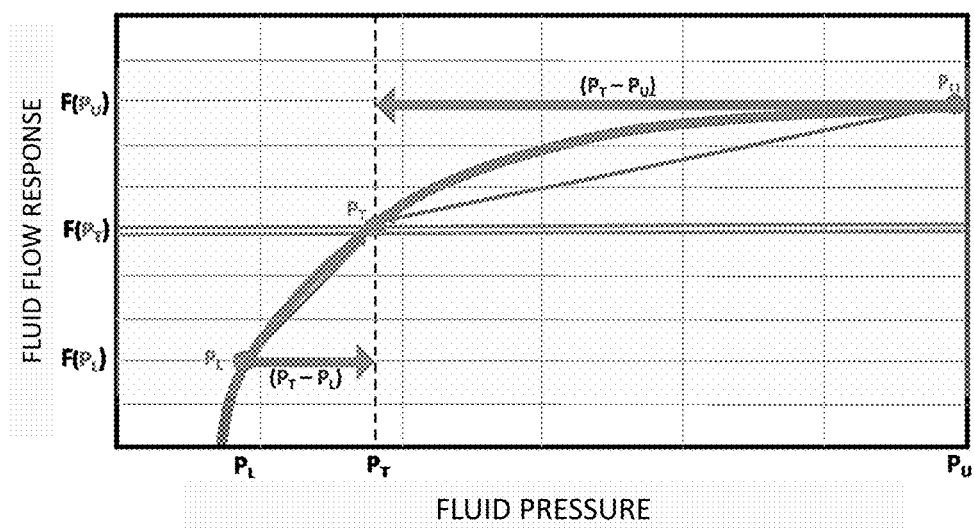
FIG. 8 is a graph illustrating the fluid flow response to process parameter input of the system for fluid dispensing control, according to an embodiment of the invention.

In a related embodiment, FIG. 5 illustrates a method for fluid dispensing control 500, including:
- a) executing a parameter sweep 502, wherein a sweep of the dispensing process parameters 316 is performed in a dispensing system 100, including a fluid dispenser 112, which can include a dispensing head with a predetermined orifice size; wherein further related embodiments can include that:
  - i. the fluid dispenser 112 can be configured as a time-pressure dispense valve, such that dispensing process parameters 316 include fluid pressure and dispense time;
  - ii. the fluid dispenser 112 can be configured as a pump valve, such that dispensing process parameters 316 include dispensing process frequency, dosage on-time, and number of actuations per time unit;
  - iii. the fluid dispenser 112 can be configured as an auger valve, such that dispensing process parameters 316 include screw revolutions per time unit, and fluid pressure;
    - such that a sweep can be done by measuring a predetermined number of equidistant points across the applicable domain range;
  - wherein, in an example embodiment, for the case of time-pressure fluid dispensing, a pressure sweep can be carried out in discrete steps between allowed pressure limits. During this process, the system recognizes the trend and rate changes and adjusts the pressure steps, in order to (1) optimize the pressure steps intervals and (2) expedite the process, for example such that:
    - when response 312 variation from a preceding sample to a succeeding sample is larger than an upper variation threshold, the pressure step interval is reduced by a predetermined pressure decrement value; and
    - when response 312 variation from a preceding sample to a succeeding sample is below a lower variation threshold, the pressure step interval is increased by a predetermined pressure increment value;
    - wherein, a similar process is followed for dosage time;
  - wherein, in a related embodiment, FIG. 6 depicts the dispensing parameter pressure sweep for a time-pressure fluid dispensing system between allowed pressure limits, P1 and P6;
- b) Logging system response data 504, wherein the system response 318 is associated with each sweep data point 316, such that the result is a set of system samples, wherein each sample, <parameters 316, response 318>, is a parameter sample point 316 mapped to an actual system response 318.
  - i. This set of system samples will grow as more data is generated during successive process runs and more input parameters are being used during these process runs or production runs and/or further data collection schemes are performed. The collected sample set can be analyzed with well-known business intelligence/ big data and/or data analysis tools;
- c) Validate response data 506, wherein:
  - i. sample data is validated against a predetermined set of error conditions, which for example can indicate hardware issues or fluid quality issues, and will make a determination to halt the process and alert the user; for example if no-flow is detected even though fluid flow is expected to occur, the system will alert user. Alternatively, if fluid flow is greater than a predetermined maximum fluid flow or lower than a predetermined minimum fluid flow, an error or warning can be issued, and the process can be halted.
  - ii. If all the expected trends and system response are checked and consistent with the values predicted by the algorithm and with previous runs, then the dispense system parameterization starts.
  - In a related embodiment, FIG. 7 depicts an example of the parameterization curve of the fluid dispensing system response to the dispense parameter pressure sweep: $F(P)=20 \ln(P)-25K$; this is for time-pressure dispense type;
- d) Calculating dispensing system response 508, wherein:
  The parameterization manager 214 of the fluid dispensing control device 102 is configured with a parameterized system response function, which is calculated to fit parameter sweep data, such that
  - i. In general, the response 318 of the system to a sweep of n dispensing parameters can be a surface in n-space, if parameters are non-independent the sweeps would include those sweeps of correlated sweeps. In general, the system response function, can be defined as a parameterized function in the form: F(j-Input Dispense Parameters)|Configuration (such that F is specific to the particular system 100 configuration);
  - ii. The system response function, representing the entire fluid dispensing system is continuously upgraded to account for new data generation during various processes, including High Volume Manufacturing (HVM) runs. Although the intelligence built-in in the algorithm may censor out data, it may also keep such data for future upgrading should that become a norm or permanent shift seen from the data itself. For example, if the fluid material becomes such that its physical properties are different from original batch used for the master parameterization the intelligence of the algorithm will adopt the new data representing the actual norm of the material. This is done for instance, by accounting for the frequency of occurrence of a system response and/or a permanent shift in the mean of the distribution to a fixed process parameter subset input;
  - iii. The intelligence of the system for fluid dispensing control 100 consists mainly in stochastic analysis of system response to process parameter inputs for a given fluid dispenser 112, such that the parameterized system response function is calculated as a best fit according to a pre-determined stochastic function, using well-known algorithms/methods for probability distribution fitting, which can include parametric fitting using method of moments, method of I-moments, and maximum likelihood estimation. The pre-determined stochastic function can include binomial and normal distribution. For analysis of the variances a Chi-Square test can be used. For the mean analysis various methods can be employed, including the ANOM and Fisher test; or
    1. In a related embodiment, the parameterized system response function can be calculated as a best fit using well-known multi-dimensional function fitting algorithms such as for example polynomial regression analysis or least square approximation; or
2. In a related embodiment, the parameterized system response function can be calculated well-known machine learning algorithms, including for example neural network back-propagation, support vector machines, etc.

e) Calculating dispensing parameters 510 to attain target dispensing system response, wherein:
   i. the dispensing controller 210 of the fluid dispensing control device 102 can be configured to perform an inverse calculation with the parameterized system response function, in communication with the parameterization manager 214, to compute an input dispensing parameter subset 420 to obtain a desired/target response 424; wherein alternatively:
      1. the dispensing controller 210 can calculate an inverse system response function, as an inverse function of the parameterized system response function, such that the inverse system response function calculates a dispensing parameter setting 316 based on input of a target system response 318. Note that the inverse system response function may in some cases be non-deterministic and return several dispensing parameter settings. The inverse system response function can in some cases be calculated algebraically, when the exact form of the parameterized system response function is known; or
      2. the dispensing controller 210 can calculate the inverse system response function by using a function solver, using well-known methods of function solving including numerical function optimization methods, such as steepest descent optimization.

f) Testing system conformance 511, wherein conformity is tested of the current system in relation to the original system used for sampling; such that:
   i. If the present system is well represented or consistent with the original master system, deviation should not be very significant or have a large mean shift away from the master system, such that for example if a measured response deviates more than a predetermined maximum percentage deviation the current system will be declared non-conformant. The algorithm recognizes deviations and will alert the user to check system, hardware and input parameter values, if such variation persists and is large, a new characterization of the system will be performed;
   ii. If the deviations are not too large, parameterized expression will still converge to target, however the input parameters may differ from original master set inputs. The system algorithm will recognize this and will give statistical deviation information to the user;
   iii. The algorithm uses knowledge from previous dispensing which has a quantitative description by the dispensing system parameterized expression to initiate the convergence process as well as to curtail it during the computation process;
   iv. During this process, the algorithm will find the parameters within limits to obtain the desired/target 424 dispense response. The determination of these parameters will be such that proximity to upper and lower limits and robustness of the parameter subset 420 in question are considered. Should some of the process parameters be outside defined range or so close to the band limits that the intrinsic variation 428 of the process can affect the robustness, the algorithm will alert the user and propose a different subset that complies with predetermined robustness definitions, and all this is guided by the original parameterization of the system;

g) Assessing intrinsic variation of dispensing system 512, wherein:
   i. On the second phase of the process the algorithm performs a multi-point sampling of response 422 with fixed dispensing parameters 420, wherein the dispensing parameters subset 420 recommended to use to obtain desired system response 426 are exercised multiple times and the corresponding system response 426 variation to that single subset of inputs is quantitatively analyzed to determine the stochastic behavior i.e., pseudo-random variation observed;
   ii. A statistical analysis will determine what is known as the intrinsic variation 428 of the dispensing system. Such variation, also known in some disciplines as "white noise", is not trended, and for our system considered a high frequency variation. This variation and those that occur at frequencies with periods longer than the control system response 318 time constant are not compensated for with this system;

h) Determining variation band for production 514, wherein:
   i. Another part of this process is for the algorithm to calculate and exorcise a window band 430 for production such that the window band 430 can lead to high yields in the fluid dispensing HVM environment. During this part of the algorithm, the dispensing process response 422 to a process variable subset 420 will be coupled to the original master response and the manufacturing band can be defined with projections on manufacturing yields, rework, etc.;

i) Controlling fluid dispensing process response 516, wherein the dispensing controller 210 of the fluid dispensing control device 102 is configured with a control function to control fluid dispending, in communication with the fluid dispenser 112, such that:
   i. The knowledge of the system response to input parameters, as encoded in the parameterized system response function, can guide the corresponding adjustment needed for keeping the dispensing process response within a defined band. Different places in the domain may exhibit different behavior and this is to be considered when controlling the system; such that:
      1. In an example embodiment, when keeping the response time within the defined band this can be done without convergences, which although stable could produce inputs that result in out-of-band values for the system response. Such out-of-band values are unacceptable in a real manufacturing environment where actual parts are being manufactured and major deviation are to be avoided. Having determined the overall behavior of the system, from parameterization, the system for fluid dispensing control 100 can use such information to perform trials in the inputs that will bring the system response to the predefined mean within the band. The knowledge of the system response becomes a powerful tool to curtail the inputs and perform input variations that do not cause major system response outside band, yet keeps process steady;

ii. The control function can be configured as a non-Markovian process, wherein the system response to a process input to be maintained within a predefined band is realized even for those cases where the response time of the control algorithm and hardware is longer than the actual dispensing process. This is accomplished by the system keeping the prior state of the dispensing process, and using the prior state history, along with present response, to control and minimize mean shifts;

iii. In a related embodiment, the control function can be configured as a feedback control function, which is configured to adjust from a starting point of the calculated dispense parameters. The feedback control function can for example be a proportional-integral-derivative controller. The stochastic behavior and intrinsic random variation of the volume/mass of the fluid being dispensed, is considered as part of the response function and treated accordingly in the feedback control function.

iv. In a related embodiment, FIG. 8 shows the fluid flow response to process parameter input, i.e., fluid pressure and the master parameterization curve. The target response and the band are also shown and two points lying away from the expected value (F($P_T$), $P_T$), the master curve dictates what pressure differential to apply to come to targeted mean. The point below (F($P_L$), $P_L$) and the point above (F($P_U$), $P_U$) require different delta-P adjustment, known from the parameterized system; and j) Performing a fluid flow to mass/volume normalization 518, wherein:

i. the system for fluid dispensing control 100 is calibrated to actual mass and mass rate for any fluid independent of their physical properties. In this process, the algorithm computes normalization for the fluid flow rate reading to mass rate, and for real time volume computation being performed by the algorithm to mass. The fluid dispensing is performed, and in an automated manner the amount of fluid dispensed is weighed on a scale 130, such that the weight is then input in the system or read directly by the system for fluid dispensing control 100 and the conversion factors are determined.

In a related embodiment of the system for fluid dispensing control 100, the fluid dispensing control device 102 can be configured with a parameterized system response function; such that the fluid dispensing control device 102 is configured to control the fluid dispenser 112 to attain a predetermined fluid dispensing target, via lookup in the parameterized system response function to compute an input dispensing parameter subset.

In an embodiment, a system for fluid dispensing control 100, can include:

a) a fluid dispensing control device 102;
b) a fluid dispenser 112; and
c) a fluid flow meter 114;

wherein the fluid dispensing control device 102 communicates with the fluid dispenser 112 to control dispensing of a fluid 122, such that the fluid dispensing control device 102 communicates with the fluid flow meter 114 to receive information on an actual fluid flow emitted from the fluid dispenser 112;

wherein the fluid dispensing control device 102 is configured with a parameterized system response function 314, which calculates an estimated system response flow 318 based on an input dispensing parameter setting 316;

such that the fluid dispensing control device 102 is configured to control the fluid dispenser 112 to obtain a predetermined fluid dispensing target flow, via lookup in the parameterized system response function 314 to compute the input dispensing parameter setting 316.

In a related embodiment, the fluid dispensing control device can further include comprises:

a) a processor 202;
b) a non-transitory memory 204;
c) an input/output component 206;
d) a dispensing controller 210;
e) a flow monitor 212; and
f) a parameterization manager 214; all connected via
g) a data bus 220.

wherein the dispensing controller 210 is configured to communicate with the fluid dispenser 112 to control dispensing of a fluid 122, based on parameterization information obtained in communication with the parameterization manager 214; wherein the flow monitor 212 is configured to communicate with the fluid flow meter 114 to receive information on actual fluid flow from the fluid dispenser 112; and the parameterization manager 214 is configured to store, update, and process the parameterized system response function 314.

In a related embodiment, the parameterization manager 214 can be configured to process a parameter sweep, such that the parameterization manager 214 is configured to sweep through a domain of dispensing process parameters 316, such that the parameterization manager 214 is configured to obtain a set of system samples, wherein each system sample is an actual parameter setting 316 and the associated actual system response 318.

In a related embodiment, the fluid dispenser 112 can be configured as a time-pressure dispense valve 112, and the domain of dispensing process parameters 316 can include fluid pressure and dispense time.

In a related embodiment, the fluid dispenser 112 can be configured as a pump valve 112, and the domain of dispensing process parameters 316 can include dispensing process frequency, dosage per actuation, and actuation frequency, such as number of actuations per minute.

In a related embodiment, the fluid dispenser 112 can be configured as an auger valve 112, and the domain of dispensing process parameters 316 can include screw revolutions per minute and fluid pressure.

In a related embodiment, the dispensing process parameters 316 can include fluid pressure, wherein the parameterization manager can be further configured to execute a pressure sweep in discrete steps between a lower and an upper pressure limit, such that the parameterization manager 214 is configured to optimize pressure step intervals, wherein:

a) when actual response flow variation from a preceding sample to a succeeding sample is larger than an upper variation threshold, the pressure step interval is reduced by a predetermined pressure decrement value; and
b) when actual response flow variation from a preceding sample to a succeeding sample is below a lower variation threshold, the pressure step interval is increased by a predetermined pressure increment value.

In a related embodiment, the dispensing process parameters 316 can comprise fluid flow, such that that the parameterization manager is configured to identify an error condition, when an actual fluid flow is greater than a predetermined maximum fluid flow or when the actual fluid flow is lower than a predetermined minimum fluid flow.

In a related embodiment, the parameterization manager 214 can be configured to calculate the parameterized system response function 314 as a best fit calculation on the set of system samples, wherein the best fit calculation is selected from the group consisting of probability distribution fitting algorithms, multi-dimensional function fitting algorithms, and machine learning algorithms.

In a related embodiment, the best fit calculation can be based on a probability distribution fitting algorithm selected from a moments algorithm, an I-moments algorithm, and a maximum likelihood estimation algorithm.

In a related embodiment, the dispensing controller 210 can be configured to calculate the input dispensing parameter setting, such that the dispensing controller is configured to execute an inverse calculation of the parameterized system response function, in communication with the parameterization manager, such that the inverse calculation maps a target system response to the input dispensing parameter setting.

In a related embodiment, the inverse calculation can be a steepest descent numeric function optimization.

In a related embodiment, the dispensing controller 210 can be configured to identify and alert a non-conformance status, wherein for an actual input dispensing parameter setting 316, if a deviation between the actual fluid flow and the estimated system response flow exceeds a predetermined maximum percentage deviation, then the parameterization manager issues a non-conformance alert.

In a related embodiment, the dispensing controller 210 can be configured to assess an intrinsic system variation, such that the dispensing controller 210 is configured to execute a multi-point sampling of system response 318 with fixed dispensing parameters, such that the dispensing controller is configured to obtain a set of response samples and analyze the response samples by calculating an intrinsic variance distribution using a probability distribution fitting algorithm.

In a related embodiment, the dispensing controller 210 can be configured to assess an intrinsic system variation, such that the dispensing controller is configured to execute a multi-point sampling of system response 318 with fixed dispensing parameters 316, such that the dispensing controller 210 is configured to obtain a set of response samples and analyze the response samples by calculating an intrinsic variance distribution using a probability distribution fitting algorithm.

In a related embodiment, the dispensing controller 210 can be further configured with a feedback control function to control dispensing of fluid.

In a related embodiment, the feedback control function can be a proportional-integral-derivative controller.

In a related embodiment, the system for fluid dispensing control 100 can further include a scale 130, wherein the dispensing controller 210 can be further configured to weigh the fluid 122 emitted from the fluid dispenser 112 to obtain a dispensing weight, in communication with the scale 130, such that the dispensing controller 210 is configured to integrate measurements of the actual fluid flow to calculate a dispensing volume, and calculate a density of the fluid, as a ratio between the dispensing weight and the dispensing volume.

A method for fluid dispensing control 500, can include:
a) executing a parameter sweep 502, wherein a fluid dispensing control device 102 sweeps through a domain of dispensing process parameters 316 and obtains a set of system samples, wherein each system sample is an actual parameter setting 316 and the associated actual system response 318, which is obtained by measuring a flow of a fluid 122 in communication with a fluid flow meter, wherein the fluid 122 is emitted from a fluid dispenser 112, which is controlled by the fluid dispensing control device 102;
b) calculating a dispense system response 508, wherein the fluid dispensing control device 102 calculates a parameterized system response function 314 as a best fit calculation on the set of system samples, wherein the best fit calculation is selected from the group consisting of probability distribution fitting methods, multi-dimensional function fitting methods, and machine learning methods; and
c) calculating dispensing parameters 510, wherein the fluid dispensing control device 102 calculates an input dispensing parameter setting 316 based on a target system response 318, such that the fluid dispensing control device 102 executes an inverse calculation of the parameterized system response function 314, such that the inverse calculation maps the target system response to the input dispensing parameter setting.

In a related embodiment, the method for fluid dispensing control 500 can further include:
a) testing system conformance
wherein the fluid dispensing control device 102 issues a non-conformance alert, if a deviation between an actual system response flow 318 and an estimated system response flow 318 exceeds a predetermined maximum percentage deviation.

In a related embodiment, the method for fluid dispensing control 500 can further include:
a) assessing intrinsic system variation;
wherein the fluid dispensing control device 102 executes a multi-point sampling of system response with fixed dispensing parameters 316, such that the fluid dispensing control device 102 obtains a set of response samples and analyzes the response samples by calculating an intrinsic variance distribution using a probability distribution fitting algorithm.

Related embodiments of the system for fluid dispensing control 100 can include items:
a) Mathematical parameterization of a complete fluid dispensing system with the corresponding dispense process parameters.
b) Item a. wherein the parameterization of the complete fluid dispensing system is stored in a recipe library where it can be updated as to make an intelligent and dynamic parameterized data base that can be retrieved for use upon request or by the system upon intelligent recognition of a fluid dispense system.
c) Item a. wherein the parameterization of the complete fluid dispensing system is used to compute process variables 316 as to obtain a desired fluid dispensing response.
d) Item a. wherein the system parameterization and the exorcising of various process parameters are used to determine system fluid dispensing intrinsic variation
e) Item a. wherein the mathematical parameterization is used to recognize deviations from hardware or dispensing parameters when computing dispensing process parameters to attain a desired fluid dispensing response within a pre-defined dispensing system response band.
f) An automated process to normalize flow rate of any fluid to mass rate and any fluid volume computed in real time by the algorithm, to fluid mass. A weight scale 130 is used to measure mass of the fluid dispensed that was monitored by the control system and then this weight result is processed by the algorithm to convert units through normalization. The algorithm is computing the fluid volume being dispensed in real time and the calibration converts that volume in fluid mass.

g) A process to calculate fluid volume from fluid flow rate and then convert it to actual fluid mass by a normalization algorithm as is being dispensed.

Figure 2:
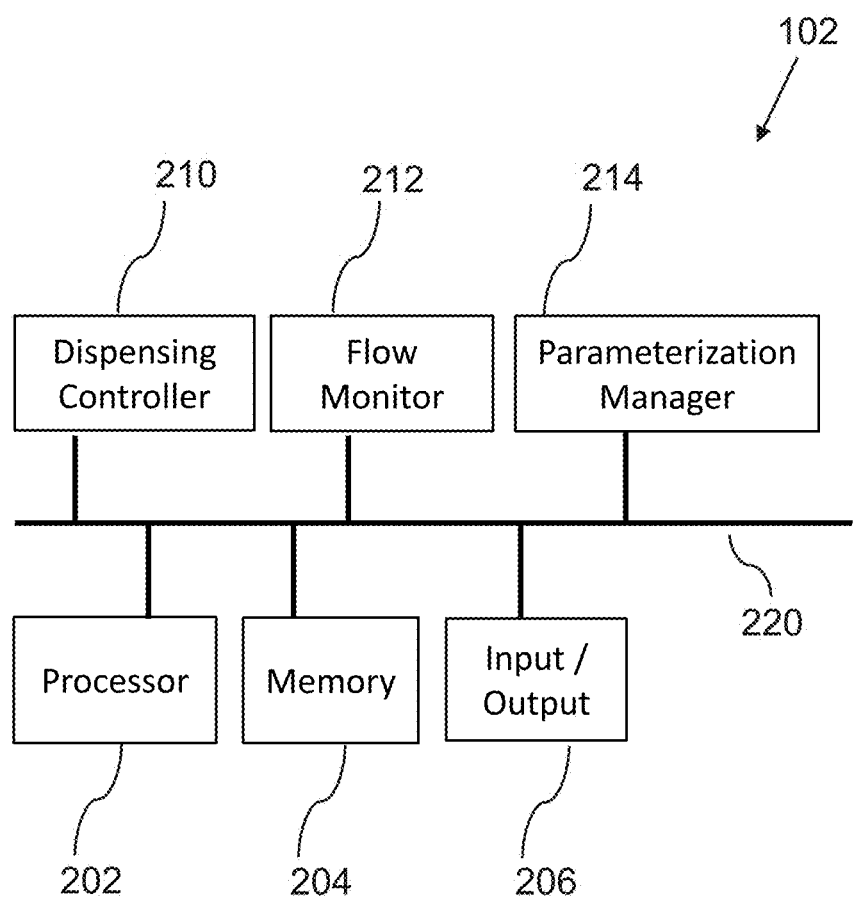
FIG. 2 is a schematic diagram illustrating a fluid dispensing control device, according to an embodiment of the invention.

FIGS. 1, 2 and 5 are block diagrams and flowcharts, methods, devices, systems, apparatuses, and computer program products according to various embodiments of the present invention. It shall be understood that each block or step of the block diagram, flowchart and control flow illustrations, and combinations of blocks in the block diagram, flowchart and control flow illustrations, can be implemented by computer program instructions or other means. Although computer program instructions are discussed, an apparatus or system according to the present invention can include other means, such as hardware or some combination of hardware and software, including one or more processors or controllers, for performing the disclosed functions.

In this regard, FIGS. 1 and 2 depict the computer devices of various embodiments, each containing several of the key components of a general-purpose computer by which an embodiment of the present invention may be implemented. Those of ordinary skill in the art will appreciate that a computer can include many components. However, it is not necessary that all of these generally conventional components be shown in order to disclose an illustrative embodiment for practicing the invention. The general-purpose computer can include a processing unit and a system memory, which may include various forms of non-transitory storage media such as random access memory (RAM) and read-only memory (ROM). The computer also may include nonvolatile storage memory, such as a hard disk drive, where additional data can be stored.

FIG. 1 shows a depiction of an embodiment of the system for fluid dispensing control 100, including the fluid dispensing control device 102.

It shall be understood that the above-mentioned components of the fluid dispensing control device 102 are to be interpreted in the most general manner.

For example, the processor 202, can include a single physical microprocessor or microcontroller, a cluster of processors, a datacenter or a cluster of datacenters, a computing cloud service, and the like.

In a further example, the non-transitory memory 204 can include various forms of non-transitory storage media, including random access memory and other forms of dynamic storage, and hard disks, hard disk clusters, cloud storage services, and other forms of long-term storage. Similarly, the input/output 206 can include a plurality of well-known input/output devices, such as screens, keyboards, pointing devices, motion trackers, communication ports, and so forth.

Furthermore, it shall be understood that the fluid dispensing control device 102 can include a number of other components that are well known in the art of general computer devices, and therefore shall not be further described herein. This can include system access to common functions and hardware, such as for example via operating system layers such as Windows, Linux, and similar operating system software, but can also include configurations wherein application services are executing directly on server hardware or via a hardware abstraction layer other than a complete operating system.

An embodiment of the present invention can also include one or more input or output components, such as a mouse, keyboard, monitor, and the like. A display can be provided for viewing text and graphical data, as well as a user interface to allow a user to request specific operations. Furthermore, an embodiment of the present invention may be connected to one or more remote computers via a network interface. The connection may be over a local area network (LAN) wide area network (WAN), and can include all of the necessary circuitry for such a connection.

In a related embodiment, the fluid dispensing control device 102 communicates with the fluid dispenser 112 over a network, which can include the general Internet, a Wide Area Network or a Local Area Network, or another form of communication network, transmitted on wired or wireless connections. Wireless networks can for example include Ethernet, Wi-Fi, Bluetooth, ZigBee, and NFC. The communication can be transferred via a secure, encrypted communication protocol.

Typically, computer program instructions may be loaded onto the computer or other general-purpose programmable machine to produce a specialized machine, such that the instructions that execute on the computer or other programmable machine create means for implementing the functions specified in the block diagrams, schematic diagrams or flowcharts. Such computer program instructions may also be stored in a computer-readable medium that when loaded into a computer or other programmable machine can direct the machine to function in a particular manner, such that the instructions stored in the computer-readable medium produce an article of manufacture including instruction means that implement the function specified in the block diagrams, schematic diagrams or flowcharts.

In addition, the computer program instructions may be loaded into a computer or other programmable machine to cause a series of operational steps to be performed by the computer or other programmable machine to produce a computer-implemented process, such that the instructions that execute on the computer or other programmable machine provide steps for implementing the functions specified in the block diagram, schematic diagram, flowchart block or step.

Accordingly, blocks or steps of the block diagram, flowchart or control flow illustrations support combinations of means for performing the specified functions, combinations of steps for performing the specified functions and program instruction means for performing the specified functions. It will also be understood that each block or step of the block diagrams, schematic diagrams or flowcharts, as well as combinations of blocks or steps, can be implemented by special purpose hardware-based computer systems, or combinations of special purpose hardware and computer instructions, that perform the specified functions or steps.

As an example, provided for purposes of illustration only, a data input software tool of a search engine application can be a representative means for receiving a query including one or more search terms. Similar software tools of applications, or implementations of embodiments of the present invention, can be means for performing the specified functions. For example, an embodiment of the present invention may include computer software for interfacing a processing element with a user-controlled input device, such as a mouse, keyboard, touch screen display, scanner, or the like. Similarly, an output of an embodiment of the present invention may include, for example, a combination of display software, video card hardware, and display hardware. A processing element may include, for example, a controller or microprocessor, such as a central processing unit (CPU), arithmetic logic unit (ALU), or control unit.

Here has thus been described a multitude of embodiments of the system for fluid dispensing control 100 and methods related thereto, which can be employed in numerous modes of usage.

The many features and advantages of the invention are apparent from the detailed specification, and thus, it is intended to cover all such features and advantages of the invention, which fall within the true spirit and scope of the invention.

Many such alternative configurations are readily apparent, and should be considered fully included in this specification. Accordingly, since numerous modifications and variations will readily occur to those skilled in the art, it is not desired to limit the invention to the exact construction and operation illustrated and described, and thus, all suitable modifications and equivalents may be resorted to, falling within the scope of the invention.

What is claimed is:

1. A system for fluid dispensing control, comprising:
   a) a fluid dispensing control device, comprising:
      a processor;
      a non-transitory memory;
      an input/output component;
      a dispensing controller;
      a flow monitor; and
      a parameterization manager; all connected via
      a data bus;
   b) a fluid dispenser; and
   c) a fluid flow meter;
   wherein the fluid dispensing control device communicates with the fluid dispenser to control dispensing of a fluid, such that the fluid dispensing control device communicates with the fluid flow meter to receive information on an actual fluid flow emitted from the fluid dispenser;
   wherein the fluid dispensing control device is configured with a parameterized system response function, which calculates an estimated system response flow based on an input dispensing parameter setting;
   such that the fluid dispensing control device is configured to control the fluid dispenser to attain a predetermined fluid dispensing target flow, via lookup in the parameterized system response function to compute the input dispensing parameter setting;
   wherein the dispensing controller is configured to communicate with the fluid dispenser to control dispensing of a fluid, based on parameterization information obtained in communication with the parameterization manager; wherein the flow monitor is configured to communicate with the fluid flow meter to receive information on actual fluid flow from the fluid dispenser; and the parameterization manager is configured to store, update, and process the parameterized system response function.

2. The system for fluid dispensing control of claim 1, wherein the parameterization manager is configured to process a parameter sweep, such that the parameterization manager is configured to sweep through a domain of dispensing process parameters, such that the parameterization manager is configured to obtain a set of system samples, wherein each system sample is an actual parameter setting and the associated actual system response flow.

3. The system for fluid dispensing control of claim 2, wherein the fluid dispenser is configured as a time-pressure dispense valve, and the domain of dispensing process parameters comprise fluid pressure and dispense time.

4. The system for fluid dispensing control of claim 2, wherein the fluid dispenser is configured as a pump valve, and the domain of dispensing process parameters comprise dosage per actuation and actuation frequency.

5. The system for fluid dispensing control of claim 2, wherein the fluid dispenser is configured as an auger valve, and the domain of dispensing process parameters comprise screw revolutions per minute and fluid pressure.

6. The system for fluid dispensing control of claim 2, wherein the dispensing process parameters comprise fluid pressure, wherein the parameterization manager is further configured to execute a pressure sweep in discrete steps between a lower and an upper pressure limit, such that the parameterization manager is configured to optimize pressure step intervals, wherein:
   a) when actual response flow variation from a preceding sample to a succeeding sample is larger than an upper variation threshold, the pressure step interval is reduced by a predetermined pressure decrement value; and
   b) when actual response flow variation from a preceding sample to a succeeding sample is below a lower variation threshold, the pressure step interval is increased by a predetermined pressure increment value.

7. The system for fluid dispensing control of claim 2, wherein the dispensing process parameters comprise fluid flow, such that that the parameterization manager is configured to identify an error condition, when the actual fluid flow is greater than a predetermined maximum fluid flow or when the actual fluid flow is lower than a predetermined minimum fluid flow.

8. The system for fluid dispensing control of claim 2, wherein the parameterization manager is configured to calculate the parameterized system response function as a best fit calculation on the set of system samples, wherein the best fit calculation is selected from the group consisting of probability distribution fitting algorithms, multi-dimensional function fitting algorithms, and machine learning algorithms.

9. The system for fluid dispensing control of claim 8, wherein the best fit calculation is based on a probability distribution fitting algorithm selected from a moments algorithm, an I-moments algorithm, and a maximum likelihood estimation algorithm.

10. The system for fluid dispensing control of claim 1, wherein the dispensing controller is configured to calculate the input dispensing parameter setting, such that the dispensing controller is configured to execute an inverse calculation of the parameterized system response function, in communication with the parameterization manager, such that the inverse calculation maps a target system response to the input dispensing parameter setting.

11. The system for fluid dispensing control of claim 10, wherein the inverse calculation is a steepest descent numeric function optimization.

12. The system for fluid dispensing control of claim 10, wherein the dispensing controller is configured to identify and alert a non-conformance status, wherein for the input dispensing parameter setting, if a deviation between the actual fluid flow and the estimated system response flow exceeds a predetermined maximum percentage deviation, then the parameterization manager issues a non-conformance alert.

13. The system for fluid dispensing control of claim 1, wherein the dispensing controller is configured to assess an intrinsic system variation, such that the dispensing controller is configured to execute a multipoint sampling of system response with fixed dispensing parameters, such that the dispensing controller is configured to obtain a set of response samples and analyze the response samples by calculating an intrinsic variance distribution using a probability distribution fitting algorithm.

14. The system for fluid dispensing control of claim 1, wherein the dispensing controller is configured to assess an intrinsic system variation, such that the dispensing controller is configured to execute a multipoint sampling of system response with fixed dispensing parameters, such that the dispensing controller is configured to obtain a set of response samples and analyze the response samples by calculating an intrinsic variance distribution using a probability distribution fitting algorithm.

15. The system for fluid dispensing control of claim 1, wherein the dispensing controller is further configured with a feedback control function to control dispensing of the fluid.

16. The system for fluid dispensing control of claim 15, wherein the feedback control function is a proportional-integral-derivative controller.

17. The system for fluid dispensing control of claim 1, further comprising a scale, wherein the dispensing controller is further configured to weigh the fluid emitted from the fluid dispenser to obtain a dispensing weight, in communication with the scale, such that the dispensing controller is configured to integrate measurements of the actual fluid flow to calculate a dispensing volume, and calculate a density of the fluid, as a ratio between the dispensing weight and the dispensing volume.

18. A method for fluid dispensing control, comprising:
a) executing a parameter sweep, wherein a fluid dispensing control device sweeps through a domain of dispensing process parameters and obtains a set of system samples, wherein each system sample is an actual parameter setting and the associated actual system response, which is obtained by measuring a flow of a fluid in communication with a fluid flow meter, wherein the fluid is emitted from a fluid dispenser, which is controlled by the fluid dispensing control device;
b) calculating a dispense system response, wherein the fluid dispensing control device calculates a parameterized system response function as a best fit calculation on the set of system samples, wherein the best fit calculation is selected from the group consisting of probability distribution fitting methods, multi-dimensional function fitting methods, and machine learning methods; and
c) calculating dispensing parameters, wherein the fluid dispensing control device calculates an input dispensing parameter setting based on a target system response, such that the fluid dispensing control device executes an inverse calculation of the parameterized system response function, such that the inverse calculation maps the target system response to the input dispensing parameter setting.

19. The method for fluid dispensing control of claim 18, further comprising:
testing system conformance;
wherein the fluid dispensing control device issues a non-conformance alert, if a deviation between an actual system response flow and an estimated system response flow exceeds a predetermined maximum percentage deviation.

20. The method for fluid dispensing control of claim 18, further comprising:
assessing intrinsic system variation;
wherein the dispensing controller executes a multi-point sampling of system response with fixed dispensing parameters, such that the dispensing controller obtains a set of response samples and analyzes the response samples by calculating an intrinsic variance distribution using a probability distribution fitting algorithm.

* * * * *